(12) United States Patent
Horesh et al.

(10) Patent No.: US 11,916,958 B2
(45) Date of Patent: Feb. 27, 2024

(54) PHISHING DETECTION AND MITIGATION

(71) Applicant: Intuit Inc., Mountain View, CA (US)

(72) Inventors: Yair Horesh, Kfar-Saba (IL); Aviv Ben Arie, Ramat Gan (IL)

(73) Assignee: Intuit Inc., Mountain View, CA (US)

( * ) Notice: Subject to any disclaimer, the term of this patent is extended or adjusted under 35 U.S.C. 154(b) by 263 days.

(21) Appl. No.: 17/573,263

(22) Filed: Jan. 11, 2022

(65) Prior Publication Data
US 2023/0224326 A1    Jul. 13, 2023

(51) Int. Cl.
*H04L 9/40*   (2022.01)
*G06N 20/00*   (2019.01)
*G06F 40/279*   (2020.01)
*G06Q 20/42*   (2012.01)

(52) U.S. Cl.
CPC ........ *H04L 63/1483* (2013.01); *G06F 40/279* (2020.01); *G06N 20/00* (2019.01); *G06Q 20/42* (2013.01)

(58) Field of Classification Search
CPC ....... H04L 9/40; H04L 63/1483; G06N 20/00; G06F 40/279; G06Q 20/42
See application file for complete search history.

(56) References Cited

U.S. PATENT DOCUMENTS

| 10,965,700 | B2 * | 3/2021 | Xie | G06F 16/258 |
| 2019/0197549 | A1 * | 6/2019 | Sharma | G06N 3/045 |
| 2023/0053675 | A1 * | 2/2023 | Edwards | G06F 21/31 |

FOREIGN PATENT DOCUMENTS

WO    WO-2023069244 A1 *   4/2023

* cited by examiner

Primary Examiner — Jayesh M Jhaveri
(74) Attorney, Agent, or Firm — Paradice & Li LLP

(57) ABSTRACT

Described herein are example implementations for handling of phishing attempts. A system receives a request to perform an electronic transaction, with the request including information regarding a user account. The system generates one or more probabilities of the request being valid based on the request and processing of a plurality of electronic transactions associated with one or more user accounts, identifies whether the request is valid based on the one or more probabilities, and in response to identifying that the request is not valid, provides an indication that the request is not valid. Processing the plurality of electronic transactions includes, for a plurality of electronic transactions including information regarding user accounts, generating a numerical representation associated with each electronic transaction, clustering the plurality of electronic transactions into one or more clusters based on the numerical representations, and, for each cluster, generating one or more aggregates of user account information.

18 Claims, 5 Drawing Sheets

100

500

```
┌─────────────────────────────────────────────────────────────────┐
│ Obtain a plurality of electronic transactions associated with  │
│ one or more user accounts, wherein each electronic transaction │
│ includes information regarding a user account of the one or    │
│ more user accounts. 502                                         │
└─────────────────────────────────────────────────────────────────┘
                              ↓
┌─────────────────────────────────────────────────────────────────┐
│ Generate a plurality of numerical representations associated    │
│ with the plurality of electronic transactions based on applying │
│ a language model to at least a portion of the information of    │
│ each electronic transaction of the plurality of electronic      │
│ transactions. 504                                               │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│  │ Apply a bidirectional language model to a vendor name of  │ │
│  │ an electronic transaction to generate the numerical       │ │
│  │ representation. 506                                       │ │
│  │  ┌ ─ ─ ─ ─ ─ ─ ─ ─ ─ ─ ─ ─ ─ ─ ─ ─ ─ ─ ─ ─ ─ ─ ─ ─ ─ ┐ │ │
│  │  │ Apply the S-BERT encoder to the vendor name to     │ │ │
│  │  │ generate a numerical vector. 508                   │ │ │
│  │  └ ─ ─ ─ ─ ─ ─ ─ ─ ─ ─ ─ ─ ─ ─ ─ ─ ─ ─ ─ ─ ─ ─ ─ ─ ─ ┘ │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────┘
                              ↓
┌─────────────────────────────────────────────────────────────────┐
│ Cluster the plurality of electronic transactions into one or    │
│ more clusters based on applying a clustering algorithm to the   │
│ plurality of numerical representations. 510                     │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│  │ Apply the DBSCAN algorithm to the plurality of numerical  │ │
│  │ vectors. 512                                              │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Filter out one or more electronic transactions associated with │
│ a cluster of insufficient size from batch processing. 514      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
┌─────────────────────────────────────────────────────────────────┐
│ For each cluster, generate one or more aggregates of the        │
│ information regarding the user account across the electronic    │
│ transactions of the cluster, wherein the one or more            │
│ probabilities are associated with the one or more aggregates.   │
│ 516                                                             │
└─────────────────────────────────────────────────────────────────┘
```

Figure 5

PHISHING DETECTION AND MITIGATION

TECHNICAL FIELD

This disclosure relates generally to automatic detection and handling of phishing attempts, including the handling of transactions to detect and handle phishing attempts by potential attackers.

DESCRIPTION OF RELATED ART

For online based services, various malicious entities may attempt to gain access to a user's sensitive account information or may attempt to have such users unknowingly provide payments to such entities. One type of attack that may be performed includes phishing. Phishing includes sending a message (such as an email, a text message, etc.) in which the malicious entity pretends to be a trusted entity to trick a human into divulging sensitive information, allowing the malicious entity to install software on a computing device, or providing payment to the malicious entity. For example, the malicious entity may send an email to a user, with the email pretending to be from a company with which the user has a subscription or an account (such as from a subscription service, a bank, etc.). The email may indicate that the user's account is about to expire, that the user's account was breached, or may provide other messages to attempt to illicit the user to click on a uniform resource locator (URL), follow a link, or perform another action in which the user mistakenly allows the malicious entity access to the user's account, sensitive information, or monies. The number of accounts and electronic transactions for online services have increased exponentially over time, and as a result, phishing attempts have increased exponentially over the same amount of time. There is a need to automatically detect and handle user account transactions associated with phishing attempts to protect users from malicious attacks.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for automatic detection of phishing attempts. The method includes receiving a request to perform an electronic transaction associated with a user account. The request includes information regarding the user account. The method also includes generating one or more probabilities of the request being valid based on the request and processing of a plurality of electronic transactions associated with one or more user accounts. The processing includes obtaining the plurality of electronic transactions (with each electronic transaction including information regarding a user account of the one or more user accounts). The processing also includes generating a plurality of numerical representations associated with the plurality of electronic transactions based on applying a language model to at least a portion of the information of each electronic transaction of the plurality of electronic transactions. The processing further includes clustering the plurality of electronic transactions into one or more clusters based on applying a clustering algorithm to the plurality of numerical representations. The processing also includes, for each cluster, generating one or more aggregates of the information regarding the user account across the electronic transactions of the cluster. The one or more probabilities are associated with the one or more aggregates. The method further includes identifying whether the request is valid based on the one or more probabilities. The method also includes, in response to identifying that the request is not valid, providing an indication that the request is not valid.

Another innovative aspect of the subject matter described in this disclosure can be implemented in a system for automatic detection of phishing attempts. An example system includes one or more processors and a memory storing instructions that, when executed by the one or more processors, cause the system to perform operations. The operations include receiving a request to perform an electronic transaction associated with a user account. The request includes information regarding the user account. The operations also include generating one or more probabilities of the request being valid based on the request and processing a plurality of electronic transactions associated with one or more user accounts. The processing includes obtaining the plurality of electronic transactions (with each electronic transaction including information regarding a user account of the one or more user accounts). The processing also includes generating a plurality of numerical representations associated with the plurality of electronic transactions based on applying a language model to at least a portion of the information of each electronic transaction of the plurality of electronic transactions. The processing further includes clustering the plurality of electronic transactions into one or more clusters based on applying a clustering algorithm to the plurality of numerical representations. The processing also includes, for each cluster, generating one or more aggregates of the information regarding the user account across the electronic transactions of the cluster. The one or more probabilities are associated with the one or more aggregates. The operations further include identifying whether the request is valid based on the one or more probabilities. The operations also include, in response to identifying that the request is not valid, providing an indication that the request is not valid.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 shows an illustrative flow chart depicting an example process for batch processing of previous electronic transactions, according to some implementations.

Like numbers reference like elements throughout the drawings and specification.

DETAILED DESCRIPTION

Figure 1:
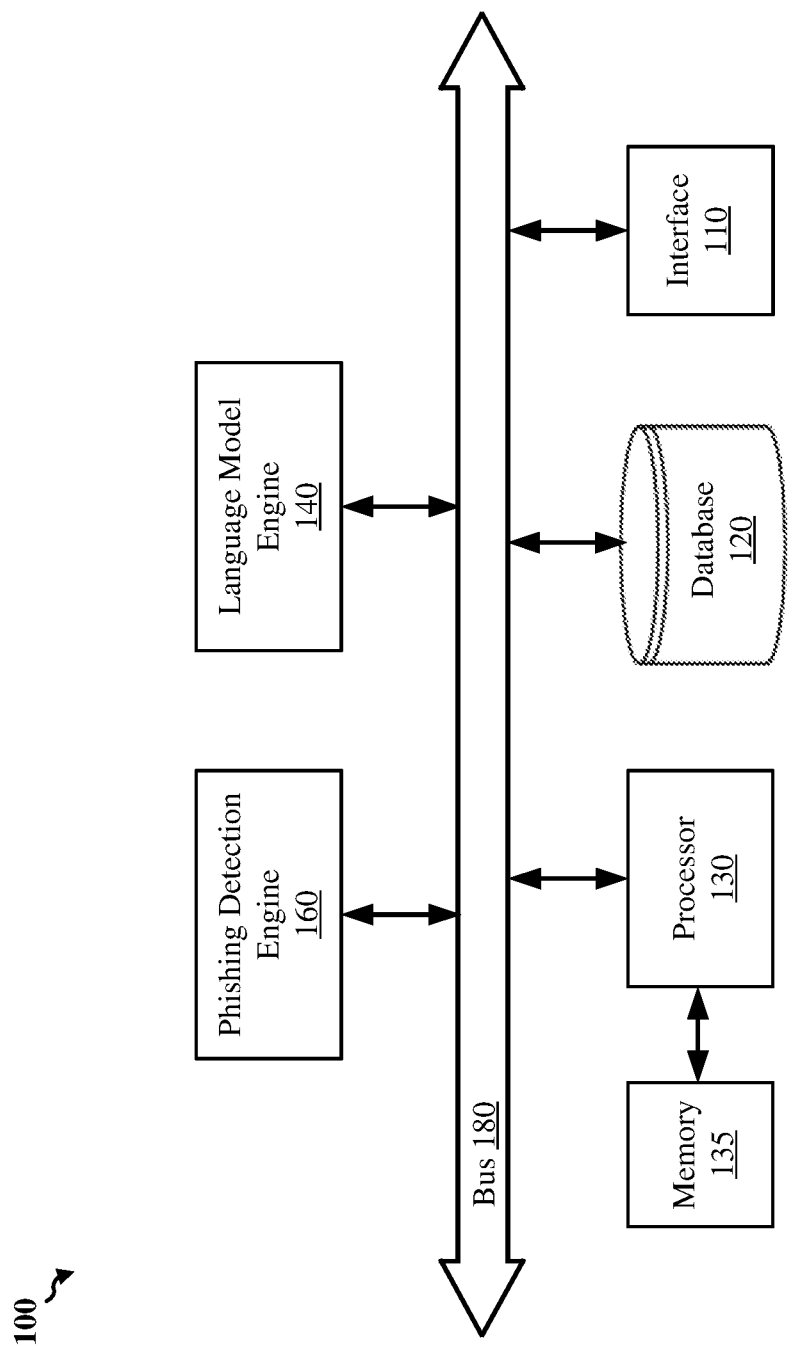
FIG. 1 shows an example computing system to automatically detect and handle phishing attempts, according to some implementations.

Implementations of the subject matter described in this disclosure may be used for the automatic detection and handling of phishing attempts. In particular, systems and methods are described to detect requested electronic transactions that may be associated with a phishing attempt.

As used herein, a phishing attempt may refer to traditional instances of phishing scams (such as unsolicited emails, texts, or other types of messages to cause a user to divulge sensitive information, allow access to a user account, or transfer money or other assets to an unintended entity) or may refer to other types of scams causing an electronic transaction that would be unwanted by a user. An electronic transaction may refer to any computer implemented operation regarding a user account. For example, an electronic transaction may include a financial transaction executed for a user account (such as a payment to a vendor). Other types of electronic transactions may include access to a user account, a change in user credentials or other information for a user account, or access to payment account information for a user account. As used herein, a vendor may refer to a business or entity that provides a product or service to a user or processes payments for another business or entity. A user may refer to an individual, a company, or a different type of entity that has a user account.

A company or other type of entity may provide products or services to various users, with each user having a user account. For example, a company may provide a subscription service (such as a video streaming service), and people with access to the service have a user account with the company. In another example, a financial institution (such as a financial investment firm or a bank) may provide financial accounts to users, and users may have access to a financial account online (such as via a smartphone, tablet, or computer application or a web browser portal). A user account may exist for each user to allow access to an associated financial account via an application or web browser portal. In a further example, a company may provide software as a service (SaaS) or other service to a variety of users, and a user account may exist for each user to allow access to the service. For the examples described herein, the service being provided is the service Intuit® QuickBooks (QB), such as QuickBooks Online (QBO). QBO is an accounting service that may be accessed by a user via an application or a web browser portal. QBO may be used to manage financial transactions between vendors and the users (such as automatically setting up payments to vendors or receiving and noting payments from others). For example, one or more financial accounts (such as a business or personal checking or savings account or line of credit) may be linked to a QBO user account, and QBO may organize and initiate transactions from the one or more financial accounts for bookkeeping and accounting purposes. Some users may also be provided with a line of credit directly through QBO for payments to vendors.

Various electronic transactions exist for such services. For example, QBO may be used by a user to initiate rent payments to a landlord, bill payments to utilities, monthly payments to subscription services, and so on from a user's financial account. To note, while the examples describe financial transactions as example electronic transactions, an electronic transaction may also be a non-financial transaction (such as a login attempt to the account, accessing specific portions of the service while logged in, initiating adding a trusted person to access the account, and so on). The number of electronic transactions and the amount of sensitive information accessible online have increased over time. As a result, scams by malicious entities to attempt online access to such sensitive information (including access to a financial account) or cause a user to mistakenly divulge such sensitive information has increased over time. A well-known type of scam is phishing in which a malicious entity pretends to be a trusted entity (such as a company that provides a subscription service or a financial institution) and contacts a user to attempt to cause the user to mistakenly divulge sensitive information regarding the user's account or to cause the user to transfer money or other assets to the malicious entity (such as the user to provide login credentials for the malicious entity to login into the account and initiate a payment unknown to the user or the user to initiate a payment to the malicious entity masquerading as a trusted entity).

Traditionally, a company that provides a service may employ a security team to look out for requested or executed electronic transactions that may be associated with a phishing attempt. For example, a person of the security team may manually review a history of access to the user account based on an internet protocol (IP) address to determine deviations in location from which the user account is accessed in order to identify an attempted attack on the user account. In another example, the person may manually review the amounts of payments to vendors from a user account in order to identify an outlier payment size that may be associated with an attempted attack on the user account. In a further example, the person may manually review the vendors to whom payments are made to search for known malicious entities.

As the number of electronic transactions have increased exponentially over time, it has become unfeasible to exclusively use manual review of electronic transactions to identify phishing attempts. In addition, the sophistication of phishing attempts has increased over time to cause electronic transactions associated with a phishing scam to be difficult to be identified by a security team or even using simple, defined rules (such as flagging payments greater than a defined amount or to new vendors). For example, an entity performing a phishing scam against a user may attempt to spoof a trusted vendor name (but with a very small variation to still appear the same) and may request a payment for less than an amount known to cause the payment to be flagged in order for any electronic transaction to be processed without the phishing attempt being detected in the moment. As such, there is a need to improve the detection and handling of electronic transactions associated with phishing attempts to protect users of a service.

Various implementations of the subject matter disclosed herein provide one or more technical solutions to the technical problem of automatically detecting and handling phishing attempts associated with electronic transactions for one or more user accounts. A computing system may be configured to identify a requested electronic transaction as being associated with a phishing attempt or as being valid, with transactions associated with phishing attempts being indicated to a user or security team or being prevented from being executed. The identification may be based on the processing of electronic transactions to find deviations between the requested electronic transaction and the previous electronic transactions for a same vendor. In some implementations, a computing system is configured to receive a request to perform an electronic transaction associated with a user account (with the request including information regarding the user account). The computing system is also configured to: generate one or more probabilities of the request being valid based on the request and processing of a plurality of electronic transactions associated with one or more user accounts; identify whether the request is valid based on the one or more probabilities; and in response to identifying that the request is not valid, provide an indication that the request is not valid. The computing system may also be configured to prevent execution of the requested electronic transaction in response to identifying that the request is not valid. The processing of the plurality of electronic transactions includes: obtaining the plurality of electronic transactions (with each electronic transaction including information regarding a user account of the one or more user accounts); generating a plurality of numerical representations associated with the plurality of electronic transactions based on applying a language model to at least a portion of the information of each electronic transaction of the plurality of electronic transactions; clustering the plurality of electronic transactions into one or more clusters based on applying a clustering algorithm to the plurality of numerical representations; and for each cluster, generating one or more aggregates of the information regarding the user account across the electronic transactions of the cluster (with the one or more probabilities being associated with the one or more aggregates). The use of the language model allows the automatic clustering of electronic transactions based on vendor names which may not be exactly the same but are similar and are to refer to the same vendor. Identifying whether a requested electronic transaction (also referred to as a request) is valid based on the one or more probabilities may be through the use of one or more thresholds or through the use of a trained machine learning (ML) model.

Various aspects of the present disclosure provide a unique computing solution to a unique computing problem that did not exist prior to the creation of online services, the creation of language models to convert to text to numerical representations, and the creation of ML models and other computer-implemented models for handling electronic data. In addition, reviewing thousands or even millions of electronic transactions in near real-time (such as every second, minute, or hour) cannot be performed in the human mind, much less using pen and paper. As such, implementations of the subject matter disclosed herein are not an abstract idea such as organizing human activity or a mental process that can be performed in the human mind.

FIG. 1 shows an example system 100 to automatically detect and handle phishing attempts, according to some implementations. The system 100 includes an interface 110, a database 120, a processor 130, a memory 135 coupled to the processor 130, a language model engine 140, and a phishing detection engine 160. In some implementations, the various components of the system 100 may be interconnected by at least a data bus 180, as depicted in the example of FIG. 1. In other implementations, the various components of the system 100 may be interconnected using other suitable signal routing resources. While not depicted in FIG. 1, in some implementations, the system 100 may also include components for the processing of previous electronic transactions (such as described with reference to example system 200 depicted in FIG. 2) or other components for the operation of the system 100 (such as to provide a service (such as QBO) to a plurality of users). As used herein, processing of the previous electronic transactions may also be referred to as "batch processing," as the "batch" of previous electronic transactions are processed.

The interface 110 may be one or more input/output (I/O) interfaces to obtain executed or requested electronic transactions (such as financial transactions to vendors) or other information to be used by the system 100. The interface 110 may also provide an indication of a requested electronic transaction that is identified as not valid, instructions to prevent the execution of a requested electronic transaction, updates to a table or other processed output regarding batch processing of a plurality of electronic transactions, or other information to be output by the system 100. If the system 100 is to provide a service to one or more users (such as hosting and executing QBO or other software to be accessed remotely by users), the interface 110 may receive user interactions and other requests from user systems and provide information to user systems when providing the service to the users. In providing the service, the system 100 may obtain (such as generate or receive) a request to perform an electronic transaction (such as to send a payment to a vendor identified by the user). If a different system is to provide a service to one or more users, the interface 110 may receive the requested electronic transaction obtained by the other system. For example, the system 100 may be a security system to review the transactions processed or to be processed by the system providing the service.

An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from one or more user devices (such as a user's personal computer) or a computing system providing the service. The interface may also be configured to communicate with one or more financial institution devices (such as to initiate financial transactions to or from a user's financial account) or other devices to perform operations associated with a user.

The interface 110 may be configured to provide an indication of a requested electronic transaction that is identified as not valid. In some implementations, a reviewer that is local to the system 100 (such as a person of a security team monitoring operation of the system 100) may be the intended recipient of the indication. In this manner, the interface 110 may include a display, a speaker, a mouse, a keyboard, or other suitable input or output elements that allow interfacing with the reviewer so that the interface 110 may provide the indication. In some implementations, an indication may be intended for a remote reviewer or for an impacted user. As such, the system 100 may use the interface 110 to provide the indication to one or more remote devices (such as via a wired or wireless interface to communicate with a remote reviewer's device or a user device). If the system 100 is to prevent the requested electronic transaction from being performed and the service is provided by a different system, the system 100 may use the interface 110 to provide instructions to the system providing the service to prevent execution of the electronic transaction. In this manner, the other system may be configured to delay execution of a transaction to give the system 100 time to review the transaction. If the system 100 provides the service, the system 100 may use the interface 110 to indicate to a user device that the requested electronic transaction was prevented from being performed.

The database 120 may store the batch processed plurality of electronic transactions. For example, a previous year of electronic transactions may be collected and processed to generate one or more aggregates of statistics or other information that may be used in identifying whether a requested electronic transaction is valid. Example aggregates may include one or more aggregates regarding payment amounts to a vendor (which may be rounded, such as to the nearest dollar or may be the exact amount), payment methods (such as credit, checking account, or savings account), the user accounts providing such payments, or the days of the month in which a payment to the vendor is made (also referred to as day-of-month payments). Other aggregates may also exist that are stored by the database 120 for use. An aggregate is described in more detail below.

The database 120 may also store other information regarding the plurality of electronic transactions, outputs of application of a language model (such as the outputs of the language model engine 140), indications of which electronic transactions are identified as not valid (such as outputs of the phishing detection engine 160), or other data for operation of the system 100. In some implementations, the database 120 may include a relational database capable of presenting information as data sets in tabular form and capable of manipulating the data sets using relational operators. The database 120 may use Structured Query Language (SQL) for querying and maintaining the database 120. While the examples herein depict operations to be performed by the system 100 for processing one electronic transaction for clarity, the system 100 may be configured to process a plurality of electronic transactions for any number of users. As such, the database 120 may be configured to maintain information for a plurality of requested electronic transactions.

In some implementations, information regarding the requested and/or previously executed electronic transactions may be stored by the database 120 in one or more tables (which is referred to herein singularly as a table). For example, each line in the table may be associated with a separate electronic transaction, and each column in the table may be associated with a different information type associated with the electronic transaction. An example portion of a table is depicted in Table 1 below. For Table 1, the electronic transactions are payments initiated using QBO for one or more QBO users (such as those users who agree to the internal use of such information for analysis purposes). Each electronic transaction includes a tuple of information regarding the initiated payment (such as an identifier of the user account, vendor name, payment amount, payment date, payment method, and so on).

(or other currency), but may be in decimal form or any other suitable format. The payment date is the date the payment is to occur from a payment account shown in a month/day/year format, but the date may be in any other suitable format (such as day/month/year) or the date may be another suitable date (such as the day that the payment is due by the vendor). The payment method indicates examples of automated clearing house (ACH) payments, credit card (CC) payments, or electronic or paper check payments. The payment ID may be a unique ID associated with the specific payment that is automatically received when initiating such payment (such as received for an initiated ACH payment). To note, a payment ID may not be received for some forms of payment or from some vendors (indicated by the n/a ("not applicable") entry in the field). If an entry does not exist for a field or the field is not applicable, the field may include an entry of n/a as shown in Table 1, no entry, or another identifier to indicate non-applicability of the field to the electronic transaction. The third party processor may be an ID of a payment processor other than the vendor (such as PayPal®, Venmo®, and so on). As shown in Table 1, the ID may be a URL to the payment processor. However, any suitable ID may be used. As shown, some fields of the column may also not be applicable for some vendors or specific electronic transactions.

While Table 1 is one example of entries in a table of electronic transactions, other columns may exist in the table for other information or the table may be in any other suitable format (such as swapping the rows and columns of the table). For example, if the table includes executed and requested electronic transactions, the table may include another column to indicate whether each electronic transaction is yet to be executed. In another example, if it is known which electronic transactions in the table are associated with a phishing attempt, the table may include another column to indicate which of the electronic transactions are associated with a phishing attempt. In a further example, if at least a portion of the electronic transactions are reviewed by the system 100 to identify electronic transactions that may not be valid (such as being associated with a phishing attempt), the table may include another column to indicate whether the system 100 identified the electronic transaction as valid or not valid. If the database 120 is a relational database, the table may be manipulated by the system 100, with relationships preserved between fields of the table. As described below, the table may be generated by the system 100, or the table may be generated by another system and provided to the system 100 for use in evaluating future electronic transactions that are requested. If the interface is to receive new electronic transactions (or new electronic transactions

TABLE 1

| User ID | Vendor Name | Payment Amount | Payment Date | Payment Method | Payment ID | Third Party Processor |
|---|---|---|---|---|---|---|
| 2428 | Verizon ® | 40 | Jun. 1, 2021 | ACH | 439199 | n/a |
| 8888 | Google ® Ads | 18 | Oct. 5, 2021 | CC | n/a | www.go0gle.com/payments |
| 8888 | John Doe | 29 | Apr. 25, 2021 | Check | n/a | n/a |

In Table 1, the user identifier (ID) is a unique number used to identify the user account. The user ID may also be referred to as a user account ID. The vendor name may be the name of the vendor receiving payment, which may be obtained by the system generating the table from an invoice, from the receiver of the payment being initiated, or manually from a user. The payment amount is shown in whole dollars are otherwise generated in providing the service), the system 100 may update the table to include the new electronic transactions.

Regarding the vendor name column in Table 1, a vendor name may vary slightly between electronic transactions associated with the same vendor. For example, payments to JPMorgan Chase Bank may be associated with a vendor name of JPMorgan Chase, JP Morgan Chase, Chase Bank, and so on. To note, while the vendor name may vary for a same vendor, the vendor names for the same vendor are similar to one another. Similarly, requested electronic transactions may include vendor names with slight variations for the same vendor. The variations in vendor name may be a result of how the payment institution labels the vendor for payments or other factors outside of the control of the company providing the service to the users.

Referring back to FIG. 1, the processor 130 may include one or more suitable processors capable of executing scripts or instructions of one or more software programs stored in system 100 (such as within the memory 135). For example, the processor 130 may be capable of executing one or more applications, the language model engine 140, or the phishing detection engine 160. If the system 100 provides the service (such as QBO), the processor 130 may also be capable of executing software associated with the service. The processor 130 may also be capable of executing instructions regarding generating a table in the database 120, processing previous electronic transactions (such as via the table) to generate aggregates for use in evaluating future electronic transactions, or other operations described herein. In some other implementations (such as described below), the processing of previous electronic transactions may be performed by another system, with the results of the processing being provided to the system 100 for use in evaluating future electronic transactions.

The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the language model engine 140, or the phishing detection engine 160 that may be executed by the processor 130. If the system 100 also is to provide the service, the memory 135 may store one or more programs that may be executed by the processor 130 to provide the service. The memory 135 may also store portions of the table or other information to be stored in the database 120 before or after processing by the engines 140 and 160, identifications of the invalid electronic transactions, or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

The language model engine 140 generates a numerical representation associated with an electronic transaction. For example, referring back to Table 1, entries in the table may include human readable text to be processed by the system 100. In addition, a received request to perform an electronic transaction may be associated with a tuple of information of the electronic transaction that is in human readable text. The language model engine 140 may apply a language model to at least a portion of the information of an electronic transaction (such as a portion of the human readable text) to generate a numerical representation associated with the electronic transaction. For example, the language model engine 140 may apply the language model to a vendor name associated with the electronic transaction to generate the numerical representation of the vendor name. In some implementations, the language model includes a bidirectional language model to be applied to at least the vendor name of the information of an electronic transaction. For example, the bidirectional language model may include a sentence-bidirectional encoder representations from transformers (S-BERT) encoder. However, any suitable language model may be used, such as a BERT encoder, other types of bidirectional language models, or unidirectional language models.

The output of the S-BERT encoder is a vector of numbers (also referred to as a numerical vector) to represent the input to the encoder. In this manner, if at least the vendor name entry of an electronic transaction is input to the S-BERT encoder, the S-BERT encoder outputs a numerical vector associated with the vendor name. While other information of an electronic transaction may also be input to the language model to generate the numerical representation, the examples herein exclusively describe inputting the vendor name to the language model for clarity in describing aspects of the present disclosure. Any language model to be used by the system 100 may be stored in the database 120, the memory 135, or another suitable component of the system 100. In some implementations, a numerical representation may be stored in a separate column of a table stored in the database 120. In some implementations, the numerical representation may be stored in a separate object, with a relationship defined between the value and the electronic transaction being stored in the database 120.

The phishing detection engine 160 identifies whether an electronic transaction is valid or not valid (such as being associated with a phishing attempt). In some implementations, the phishing detection engine 160 may generate one or more probabilities of a request for an electronic transaction being valid based on the request and the previous processing of a plurality of electronic transactions. For example, the table may include the electronic transactions over the past year across all users (or a subset of users) of the service, and the electronic transactions in the table may be processed to generate one or more aggregates of information across the electronic transactions. As noted, the processing of a plurality of objects (such as a plurality of electronic transactions) may also be referred to as "batch processing."

An aggregate may be a suitable collection of data of a data type (such as based on one of the columns of the table), such as a statistic, distribution, or the like. For example, for a specific vendor, an example aggregate regarding the payment amount may be a distribution of the payment amounts to the vendor (which may be indicated by a median, mean, standard deviation, and/or other statistic for describing the distribution). Additionally or alternatively, the aggregate of the payment amount may be a simple count of the different amounts paid to the vendor (such as the number of times X dollars is paid to the vendor or a range of dollars including X being paid to the vendor) such that the aggregate may be a step function or bar graph. An aggregate of a payment method may include the counts of the different types of payment methods used for the vendor (such as Y number of times a CC is used and so on). An aggregate of the user account may be the number of times a user ID is associated with payments to a vendor (which may be an absolute number or as compared to other users with payments to the same vendor). Another type of aggregate that may be generated is day-of-month of payments to the vendor, which may include a count of the day of the month when a payment is made to the vendor (such as how many times payment is made to the vendor on the first of the month). Similar to the aggregate of the user account, the aggregate of the day-of-month of payments may be an absolute count or with reference to other payments made one other days of the month to the vendor. While some example aggregates are described, any suitable aggregates may be used, such as day-of-week payments, vendor location, and so on.

In some implementations, the one or more aggregates that are generated are normalized to be a distribution from 0 to 1. For example, a day-of-month payment aggregate may include counts for days from 1-31, from 1-30, or from 1-28 depending on the month. The scales 1-31, 1-30, and 1-28 may be normalized to the same scale 0-1 so that counts for months with different numbers of days may be compared to one another. In another example, payment amounts to one vendor may be in the thousands of dollars while payments to another vendor may be in the hundreds of dollars. The aggregate regarding payment amounts may be normalized to the same scale 0-1 for both vendors such that the aggregated payment amount may be compared to one another. In this manner, distributions may be able to be compared across different vendors or data sets (such as comparing day-of-month payments for February to day-of-month payments for December). In some implementations, normalizing the aggregate may include ensuring that any probabilities generated by the system are along the same scale (such as from 0 to 1) so that different probabilities may be compared to one another.

A probability generated by the phishing detection engine 160 may be a probability associated with a specific data type, which may be a field of information of an electronic transaction in the table (such as regarding the payment method, the payment amount, etc.), and an aggregate generated based on batch processing of the previous electronic transactions for the data type and for a same vendor. The probability thus indicates the likelihood that a data point of the electronic transaction is valid based on the associated aggregate and the field value for the electronic transaction. For example, if an aggregate of a payment amount to a specific vendor is modeled as a normal distribution with a mean and standard deviation, the phishing detection engine 160 may compare the payment of the current transaction to the mean and standard deviation to determine a likelihood of such payment to the vendor. Any suitable statistical model may be used in generating a probability from the information of a requested electronic transaction, such as being based on a step-function, a normal distribution, or other types of distribution of the data. In some implementations, the system determines where a data point would lie in the distribution to determine the likelihood of the data point being valid for the vendor (which may be indicated as a probability from 0 to 1). With aggregates being generated for any number of data types of information of the electronic transactions, the system 100 may generate any number of probabilities for a requested electronic transaction.

In some implementations, identifying whether the requested electronic transaction is valid includes comparing the one or more probabilities to thresholds. For example, each of the probabilities associated with different aggregates for a requested electronic transaction and a specific vendor may be compared by the phishing detection engine 160 to a defined threshold associated with such probability (such as greater than 0.99 or any other suitable threshold). To note, any suitable threshold may be used, and a threshold may be static or may be adjustable by the user, a reviewer, automatically by the system 100, or using any other suitable means. Any combination of the probabilities as compared to the thresholds may be used for the phishing detection engine 160 to identify whether an electronic transaction is valid. For example, if any of the probabilities indicates less than a one percent likelihood of such electronic transaction occurring, the electronic transaction may be identified as not being valid. In another example, if a number of probabilities being less than an associated threshold is greater than three or another suitable number, the electronic transaction may be identified as not being valid.

In addition or alternative to the comparison of the probabilities to thresholds, an ML model may be used by the phishing detection engine 160 to identify whether an electronic transaction is valid. In some implementations, the previous electronic transactions for batch processing may be associated with labels indicating whether an electronic transaction is associated with a phishing attempt. For example, the table stored in the database 120 may include a column indicating whether each electronic transaction is or is not associated with a phishing attempt, or the labels may be stored separately from such table. The labels may be collected previously through reporting by other users or by the security team reviewing transactions of phishing scams associated with specific electronic transactions. In batch processing the plurality of previous electronic transactions, a system may generate one or more probabilities for each electronic transaction, input the one or more probabilities for each electronic transaction into an ML model, and use the labels as training data to perform supervised learning of the ML model. To note, any suitable ML model may be used (such as any suitable classification model), and any suitable means of training the ML model may be used based on the labels (such as through use of the Adam algorithm to train the ML model). For example, the ML model may be a machine learning model based on, e.g., one or more of decision trees, random forests, logistic regression, nearest neighbors, classification trees, control flow graphs, support vector machines, naïve Bayes, Bayesian Networks, value sets, hidden Markov models, or neural networks configured to predict whether an electronic transaction is valid. After the ML model is trained, the phishing detection engine 160 may provide the one or more probabilities generated for a requested electronic transaction to the trained ML model, and the trained ML model may thus identify whether the request for the electronic transaction is valid based on the one or more probabilities provided to the trained ML model. To note, training the ML model may be performed by the system 100 or may be performed by another system. The ML model may be stored in the database 120, the memory 135, or another suitable component of the system 100. In addition, an ML model is described as being one ML model for clarity, but the term ML model may refer to a plurality of ML models used in combination to predict whether a requested electronic transaction is valid.

To note, the one or more probabilities generated for a requested electronic transaction may be based on the vendor associated with the electronic transaction. As such, the batch processed electronic transactions (such as from the past year) may be grouped based on vendor name. As noted above, vendor names may vary slightly between electronic transactions associated with the same vendor. As described herein, the electronic transactions may be clustered into one or more clusters during batch processing based on the numerical representations of the vendor names generated using the language model (such as numerical vectors generated by the S-BERT encoder). As described below, clustering may be performed using any suitable clustering algorithm (such as the density-based spatial clustering of applications with noise (DBSCAN) algorithm). Other example clustering algorithms may include, e.g., the balanced iterative reducing and clustering using hierarchies (BIRCH) algorithm, the clustering using representatives (CURE) algorithm, the ordering points to identify the clustering structure (OPTICS) algorithm, or the k-means algorithm.

In some implementations, the S-BERT encoder is applied to a vendor name for each electronic transaction to generate a numerical vector, and the clustering algorithm is applied to the numerical vectors to generate the one or more clusters of the electronic transactions in order to group the electronic transactions based on the same vendor. In this manner, the one or more aggregates to be generated may be for each cluster, and the one or more aggregates for a cluster is based on the electronic transactions for a specific vendor. To note, the one or more aggregates or information regarding such aggregates may be stored in the database 120, the memory 135, or another suitable component of the system 100. Other aspects of batch processing and the use of the results from the batch processing are described in more detail herein.

Batch processing is performed on a plurality of prior electronic transactions before using the results of the batch processing for evaluating future electronic transactions. As such, batch processing may be referred to as being performed "offline," which refers to the batch processing being performed before deployment for use for future electronic transactions. The evaluation of a requested electronic transaction using the results of the batch processing may be referred to as being performed "online." In some implementations, the system 100 may perform both the offline and online operations described herein. In some implementations, the system 100 may perform the online operations, but a different system may perform the offline operations (such as the system 200 depicted in FIG. 2 performing the batch processing the electronic transactions).

Figure 2:
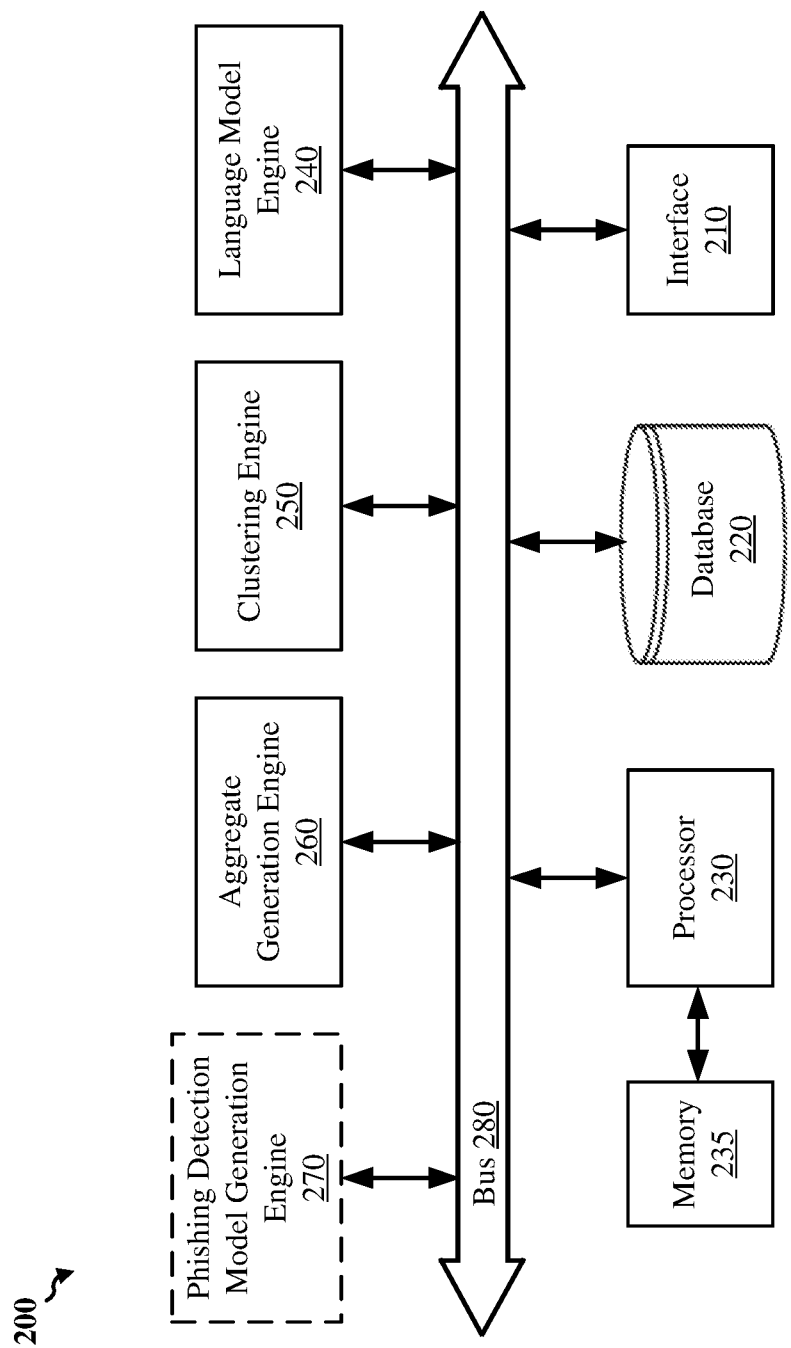
FIG. 2 shows an example computing system to perform batch processing of a plurality of electronic transactions, according to some implementations.

FIG. 2 shows an example computing system 200 to perform batch processing of a plurality of electronic transactions, according to some implementations. The system 200 includes an interface 210, a database 220, a processor 230, a memory 235 coupled to the processor 230, a language model engine 240, a clustering engine 250, and an aggregate generation engine 260. In some implementations, the system 200 may also include a phishing detection model generation engine 270. The various components of the system 200 may be interconnected by at least a data bus 280, as depicted in the example of FIG. 2. In other implementations, the various components of the system 200 may be interconnected using other suitable signal routing resources. In some implementations, system 100 and system 200 are the same system. As such, system 100 may include the components of system 200 to also perform batch processing of the electronic transactions. In addition, the components 110, 120, 130, 135, and 180 of the system 100 may be the same as the components 210, 220, 230, 235, and 280 of the system 200. In some other implementations, the system 100 may be a different system from the system 200. As such, the components for systems 100 and 200 as described herein may be implemented in any suitable manner across any suitable number of computing systems.

The interface 210 may be one or more input/output (110) interfaces to obtain a plurality of electronic transactions or other information to be used by the system 200. For example, the interface 210 may be configured to obtain the last year's worth of financial transactions for users of the service. An example interface may include a wired interface or wireless interface to the internet or other means to communicably couple with other devices (such as the system 100). For example, the interface 210 may include an interface with an ethernet cable or a wireless interface to a modem, which is used to communicate with an internet service provider (ISP) directing traffic to and from one or more user devices (such as a user's personal computer) or a computing system providing the service. The interface may also be configured to communicate with one or more financial institution devices (such as to obtain financial transactions from a user's financial account). In some implementations, the interface 210 is configured to obtain a plurality of electronic transactions (such as the last year's worth of financial transactions for the service users) from a system providing the service to the users or otherwise recording the transactions being executed on the users' behalf. As noted above, each electronic transaction may include information regarding a user account. For example, an electronic transaction may include a tuple of data elements (such as user ID, vendor name, payment amount, payment date, payment method, payment account, and URL/email/phone number/ other contact information associated with the payment). As such, the interface 210 may obtain the tuples of data elements in obtaining the electronic transactions. If the system 100 and the system 200 are separate systems, the interface 210 may also provide any aggregates generated for one or more clusters, a table of the electronic transactions, or other information that may be used to evaluate a requested electronic transaction by the system 100.

The database 220 may store the obtained plurality of electronic transactions before and/or after batch processing. For example, a previous year of electronic transactions may be collected and stored in the database 220 (such as in a table as described above). The electronic transactions may also be processed to generate one or more aggregates of statistics or other information that may be used in identifying whether a requested electronic transaction is valid. As noted above, example aggregates may include one or more aggregates regarding payment amounts to a vendor (which may be rounded, such as to the nearest dollar or may be the exact amount), payment methods (such as credit, checking account, or savings account), the user accounts providing such payments, or the days of the month in which a payment to the vendor is made (also referred to as day-of-month payments). The aggregates may be generated by the aggregate generation engine 260, and the outputs of the aggregation generation engine 260 may also be stored by the database 220. The database 220 may also store other information regarding the plurality of electronic transactions (such as labels associated with whether each electronic transaction is valid), outputs of the language model engine 240, outputs of the clustering engine 250, outputs of the optional phishing detection model generation engine 270, or other data for operation of the system 200. In some implementations, the database 220 may include a relational database capable of presenting information as data sets in tabular form and capable of manipulating the data sets using relational operators. The database 220 may use SQL for querying and maintaining the database 220.

While not depicted in FIG. 2, the system 200 may include means to generate a table of the electronic transactions (such as depicted in Table 1 above). For example, the processor 230 may execute software and/or the system may include one or more integrated circuits to cause the system 200 to generate a table that is stored in the database 220. The table may be periodically updated (such as monthly or quarterly) to include additional electronic transactions or to remove stale electronic transactions (such as those that are older than a year). In this manner, the system may periodically perform the batch processing or otherwise update the clusters and aggregates for evaluation of future electronic transactions.

The processor 230 may include one or more suitable processors capable of executing scripts or instructions of one or more software programs stored in system 200 (such as within the memory 235). For example, the processor 230 may be capable of executing one or more applications, the language model engine 240, the clustering engine 250, the aggregate generation engine 260, the optional phishing detection model generation engine 270, or other operations associated with the batch processing of a plurality of electronic transactions. As noted above, the processor 230 may also be capable of executing instructions regarding generating a table in the database 220 or other operations described herein. The processor 230 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 230 may include a combination of computing devices (such as a combination of a DSP and a microprocessor, a plurality of microprocessors, one or more microprocessors in conjunction with a DSP core, or any other such configuration).

The memory 235, which may be any suitable persistent memory (such as non-volatile memory or non-transitory memory) may store any number of software programs, executable instructions, machine code, algorithms, and the like that can be executed by the processor 230 to perform one or more corresponding operations or functions. For example, the memory 235 may store the one or more applications, the language model engine 240, the clustering engine 250, the aggregate generation engine 260, the phishing detection model generation engine 270, or other operations associated with batch processing of electronic transactions that may be executed by the processor 230. If the system 200 is to include the phishing detection model generation engine 270, an output of the engine 270 may include a trained ML model (or other types of models, such as a statistical model) to be used for the evaluation of future electronic transactions, and the memory 235 may store the model. The memory 235 may also store portions of the table or other information to be stored in the database 220 before or after processing by the engines 240-270 or any other data for operation of the system 100. In some implementations, hardwired circuitry may be used in place of, or in combination with, software instructions to implement aspects of the disclosure. As such, implementations of the subject matter disclosed herein are not limited to any specific combination of hardware circuitry and/or software.

Similar to the language model engine 140 described above with reference to FIG. 1, the language model engine 240 generates a numerical representation associated with each electronic transaction of the plurality of electronic transactions obtained. In some implementations, the language model engine 240 applies a bidirectional language model to the vendor name of the information of each electronic transaction to generate the numerical representation. For example, an S-BERT encoder may be applied to the vendor name to generate a numerical vector for each electronic transaction. The numerical vectors may be stored in the database 220 and associated with the corresponding electronic transaction stored in the database 220 (such as in a generated table).

The clustering engine 250 applies a clustering algorithm to the plurality of numerical representations corresponding to the plurality of electronic transactions in order to cluster the electronic transactions into one or more clusters. As noted above, the vendor name may not be exactly the same between electronic transactions associated with the same vendor. For example, a first electronic transaction may include a vendor name "Intuit," and a second electronic transaction may include a vendor name "Intuit Inc." Because of the slight difference in vendor names, the numerical vectors generated from "Intuit" and "Intuit Inc." using the S-BERT encoder are not exactly the same. However, the numerical vectors are similar enough such that the numerical vectors would be clustered together if mapped with relation to other numerical vectors generated from other vendor names. The clustering engine 250 may apply any suitable clustering algorithm (such as described above) to the numerical vectors generated across the plurality of electronic transactions to generate one or more clusters, with each cluster representing a unique vendor based on similar vendor names. In some implementations, the clustering engine 250 uses the DBSCAN algorithm to cluster the electronic transactions based on the numerical vectors generated using the S-BERT encoder. The results of the clustering may be stored in the database 220 or another suitable component of the system 200. For example, the table may include a column to indicate to which cluster (if any) an electronic transaction belongs. In another example, a list of electronic transaction IDs for each cluster may be used to identify the one or more clusters. In another example, the electronic transactions in the table may be sorted to be grouped with other electronic transactions of the same cluster.

The aggregate generation engine 260 generates, for each cluster, the one or more aggregates of the information regarding the user account across electronic transactions of the cluster (such as a distribution of payment amounts or other statistics as described above). As noted above with reference to FIG. 1, the one or more aggregates for each cluster may be used by the phishing detection engine 160 to generate one or more probabilities associated with a requested electronic transaction. For example, from a distribution of the payment amounts for a cluster associated with the same vendor name, the system 100 may determine the likelihood that a payment amount of the requested electronic transaction is a valid payment amount. The one or more aggregates generated by the aggregate generation engine 260 may be stored in the database 220 or another suitable component of the system 200.

In some implementations, the use of aggregates may be intended to be restricted to vendors associated with a sufficient sample size of user accounts having electronic transactions for the vendor. For example, a small vendor that receives payments from two or three users may not have sufficient data available for use in determining whether a requested transaction to such vendor may be a phishing attempt. As such, the aggregate generation engine 260 may determine the number of user accounts associated with the vendor name in the plurality of electronic transactions. For example, for each cluster, the aggregate generation engine 260 may calculate the number of unique user IDs in a cluster. The aggregate generation engine 260 may also compare the number of unique user IDs to a threshold and remove the one or more electronic transactions of the plurality of electronic transactions associated with the vendor name in response to the number being less than the threshold. For example, the aggregate generation engine 260 may determine if more than 1,000 unique user account IDs exist in a cluster. If the cluster does not include at least 1,000 unique user account IDs, the aggregate generation engine 260 may prevent generating one or more aggregates for the cluster or may otherwise indicate that a prediction is not to be generated for a requested electronic transaction associated with the same vendor name. In this manner, small sample size bias is prevented from tainting the predictions of the system 100.

As noted above, the system 100 may use a trained ML model or a statistical model to determine whether a requested electronic transaction is valid. In some implementations, the system 200 may include the phishing detection model generation engine 270 to provide the model to be used by the system 100. For example, as described above, a ML model (such as any suitable classification model) may be trained by the engine 270 using supervised learning and the labels associated with the plurality of electronic transactions to generate a prediction as to whether an electronic transaction is valid. In another example, the engine 270 may determine the thresholds to be used for various probabilities associated with different columns of the table and/or different clusters of the electronic transactions to identify whether a requested electronic transaction is valid. In some other implementations, setup and/or training of such models may occur outside of the system 200 (such as at the system 100 if system 100 and system 200 are not the same system). If the system 200 includes the engine 270, the output of the engine 270 (such as the trained ML model or another suitable model) may be stored in the database 220 or another suitable component of the system 200.

The components 140 and 160 in system 100 and the components 240-270 in system 200 may be implemented in hardware, software, or a combination of both hardware and software. In addition, while specific components are depicted for clarity in describing aspects of the present disclosure, the operations described herein may be performed using more or fewer components, using one, two, or more systems, or in other configurations not depicted herein. As such, while the examples described herein are with reference to being performed by the system 100 and the system 200 for clarity, the present disclosure is not limited to a specific system configuration to perform aspects of the present disclosure.

Figure 3:
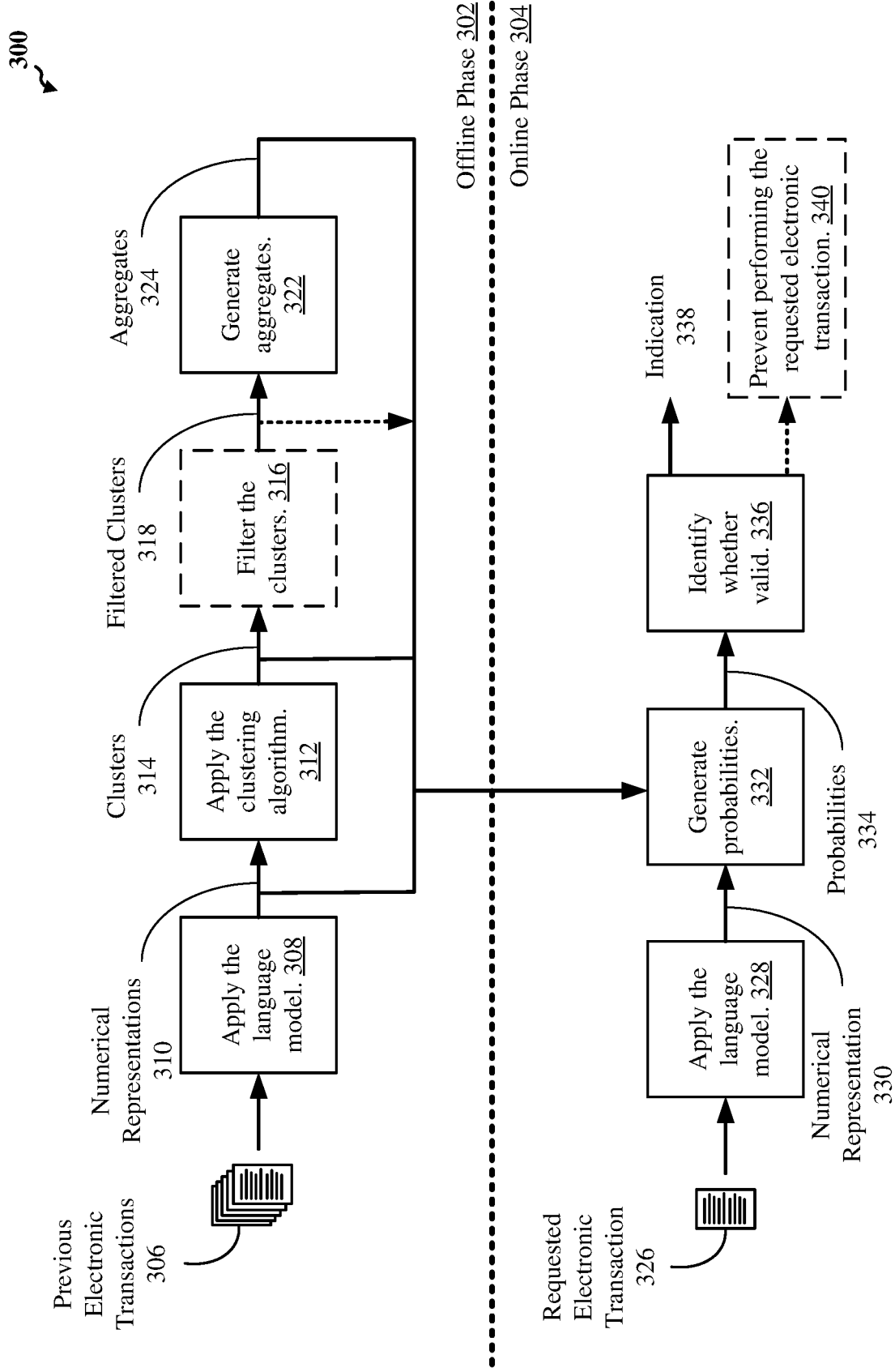
FIG. 3 shows an example process flow to identify whether a requested electronic transaction is valid, according to some implementations.

FIG. 3 shows an example process flow 300 to identify whether a requested electronic transaction is valid, according to some implementations. As noted, batch processing is performed to generate the one or more aggregates for the one or more clusters before such aggregates are used for the evaluation of a requested electronic transaction. As used herein, the operations to perform batch processing (which are described as being performed by the system 200 but may be performed by any suitable system (including system 100)) are referred to as being "offline," and the operations of to identify whether a requested electronic transaction is valid (which are described as being performed by the system 200 but may be performed by any suitable system) are referred to as being "online." The process flow 300 includes an offline phase 302 associated with the batch processing of the plurality of electronic transactions (such as the last year's worth of financial transactions across all service users) and includes an online phase 304 associated with the identification of whether a requested electronic transaction is valid based on the previous batch processing (such as based on the one or more aggregates generated for one or more clusters during batch processing). The offline phase 302 is described as being performed by the system 200 and the online phase 304 is described as being performed by the system 100 exclusively for clarity.

The offline phase 302 includes the batch processing of previous electronic transactions 306. For example, the system 200 may obtain the electronic transactions over the last year for one or more user accounts (such as for all user accounts that allow use of the electronic transaction information for analysis or a subset of the user accounts). To note, the one or more user accounts associated with the previous electronic transactions 306 may (but does not necessarily) include the user account associated with the requested electronic transaction 326. While not shown in FIG. 3, the system 200 may organize and store the previous electronic transactions 306 in tabular form (such as by placing the tuples of data points of the electronic transactions into appropriate fields, as described above). At 308, the system 200 applies the language model to generate a plurality of numerical representations 310 for the plurality of previous electronic transactions 306. For example, the language model engine 240 may apply a bidirectional language model to a vendor name of an electronic transaction to generate the numerical representation for the electronic transaction. In some implementations, the language model engine 240 applies the S-BERT encoder to the vendor name (such as applying the encoder to the vendor name field in the table row associated with the electronic transaction) to generate a numerical vector. The numerical representations may be stored in the table of electronic transactions or may be stored in a separate data object.

The process flow 300 continues to 312, in which the system 200 applies the clustering algorithm to the numerical representations 310 to cluster the previous electronic transactions 306 into one or more clusters 314. For example, the clustering engine 250 may apply the DBSCAN algorithm to the numerical vectors generated at block 308 using the S-BERT encoder to generate the clusters 314. The clusters may be noted by sorting the table of electronic transactions, by storing lists of electronic transactions included in each cluster, or by using any other suitable means.

A small sample size of a cluster may cause bias in the probabilities generated based on the cluster (such as based on the aggregates for the cluster generated via batch processing). In some implementations, the system 200 may filter out smaller clusters from the clusters 314 so that only the filtered clusters 318 remain for batch processing (316). Filtering may include the system 200 removing the electronic transactions in the cluster from the batch processing (such as by not generating one or more aggregates for the cluster or by otherwise indicating that a prediction is not to be made for an electronic transaction associated with the cluster). For example, the table may be updated to remove the electronic transactions or to indicate that specific electronic transactions are not to be used (such as by including and updating a column's fields to store a binary flag to indicate whether the specific electronic is or is not to be used for batch processing). In some implementations, the system 200 may determine the number of user accounts associated with the vendor name for each cluster (such as by counting the number of unique user account IDs across the electronic transactions of a cluster). If the number of user accounts is less than a threshold number (such as 1,000 unique user accounts in the cluster), the cluster may be filtered from batch processing. For example, the system may update the binary flags to 0 to indicate that the electronic transactions are not to be used. In some other implementations, if a cluster associated with a vendor name does not include a minimum number of total electronic transactions, the cluster may be filtered from batch processing (such as by updating the binary flags of the associated electronic transactions or removing the electronic transactions from the table). Other suitable forms of filtering to reduce small sample size bias may also be used and is not limited to the examples described herein.

The process flow 300 continues to 322, in which the system 200 generates aggregates 324 for the clusters 314 (or the filtered clusters 318 if the system 200 is to perform filtering). For example and as described above, for each cluster, the aggregate generation engine 260 may generate one or more aggregates from the information of the electronic transactions in the cluster. The aggregates 324 are used by the system 100 during the online phase 304 to evaluate future electronic transactions (such as the requested electronic transaction 326). The system 100 also uses information regarding the one or more clusters 314 (or information regarding the one or more filtered clusters 318 if the system 200 performs filtering). For example, the numerical vectors generated using the S-BERT encoder and used to generate the clusters may be used by the system 100 to compare a numerical vector of the requested electronic transaction 326 to the numerical vectors of the clusters 314 (or the filtered clusters 318). In this manner, the aggregates of the corresponding cluster that is associated with the requested electronic transaction 326 may be used to generate the one or more probabilities for the requested electronic transaction 326. As such, the aggregates 324, the clusters 314 (or the filtered clusters 318), and the numerical representations 310 may be provided by the system 200 to the system 100. While not depicted in FIG. 3, in some implementations, the system 200 may also provide the table of previous electronic transactions 306 to the system 100.

Referring to the online phase 304 of the process flow 300, the system 100 is to evaluate one or more requests to perform electronic transactions (such as the requested electronic transaction 326). The system 100 may obtain the requested electronic transaction 326, such as from a system providing a service and to initiate the requested electronic transaction or through the system 100 itself providing the service to one or more users. As used herein, a system obtaining an object may refer to the system receiving the object from another source or the system generating the object itself. At 328, the system 100 applies a language model to generate a numerical representation 330 associated with the requested electronic transaction 326. For example, the language model engine 140 may apply a bidirectional language model to a vendor name of the requested electronic transaction 326 to generate the numerical representation 330. In some implementations, the language model engine 140 may apply the S-BERT encoder to generate a numerical vector for the requested electronic transaction 326. Block 328 may be similar to block 308 of the offline phase 302.

The process flow 300 continues to 332, in which the system 100 generates probabilities 334 associated with the requested electronic transaction 326 based on the numerical representation 330, the numerical representations 310 and the clusters 314 (or the filtered clusters 318), and the aggregates 324 associated with any cluster 314 having a numerical representation 310 matching the numerical representation 330. For example, the phishing detection engine 160 compares the numerical representation 330 to the numerical representations 310 of the clusters 314 to attempt to match the numerical representation 330 to one of the clusters 314 (or to one of the filtered clusters 318 if the system 200 performs filtering).

In some implementations, if the cluster sizes are sufficient to cover all variations of a vendor name that may appear, matching the numerical representation 330 to one of the numerical representations 310 may include finding at least one numerical representation 310 that is an exact match of the numerical representation 330 in order to determine to which cluster 314 the requested electronic transaction 326 is associated. If the vendor names are exactly the same between a previous electronic transaction 306 and the requested electronic transaction 326, the numerical representation 310 of the previous electronic transaction 306 should be an exact match to the numerical representation 330 of the requested electronic transaction 326 if the language model is applied exclusively to the vendor name (such as the numerical vectors generated using the S-BERT encoder matching between the electronic transactions with the exact same vendor name).

Alternatively, the vendor name in the requested electronic transaction 326 may vary slightly from the vendor names of the previous electronic transactions 306 associated with the same vendor. In addition, the numerical representation 330 may also vary slightly if the language model is applied to any portion of information of the electronic transactions other than the vendor name. In some implementations, the system 100 may determine a distance between the numerical representation 330 and one or more numerical representations 310. For example, if the numerical representations are vectors (or scalars or other values to which a distance metric may be applied), the system 100 may calculate a distance between the numerical vector for the requested electronic transaction 326 and one or more numerical vectors associated with the previous electronic transactions 306. If a distance generated based on a numerical representation of a first electronic transaction from the previous electronic transactions 306 is less than a threshold, the system 100 may identify the vendor name of the requested electronic transaction 326 as matching that of the first electronic transaction and the requested electronic transaction 326 as being associated with the cluster including the first electronic transaction. Additionally or alternatively, the system 100 may identify a match based on the smallest distance calculated for the first electronic transaction. To note, any suitable matching algorithm, distance measurement, or other means may be used to determine to which cluster 314 the requested electronic transaction 326 is associated.

If the system 200 performs filtering during the offline phase 302, the electronic transactions of the filtered clusters 318 include the only electronic transactions used in the evaluation by the system 100 during the online phase 304. As such, any electronic transactions of clusters of insufficient size or otherwise not to be used may not have their numerical representations 310 used in comparison with the numerical representation 330. Therefore, if a cluster that was excluded from batch processing would be associated with the requested electronic transaction 326 (or the requested electronic transaction 326 is associated with a new vendor or new vendor name), the system 100 may be unable to match the requested electronic transaction 326 to one of the filtered clusters 318. While not shown in FIG. 3, in some implementations, the system 100 may provide an indication that evaluation cannot be performed for a requested electronic transaction based on not matching the requested electronic transaction to a cluster. In some other implementations, the system 100 may not perform the operations in 336 and provide an indication 338 that a requested electronic transaction 326 is not valid until there is sufficient sample size for a vendor.

To note, if the system 100 stores a table of electronic transactions, the system 100 may update the table with any new electronic transactions as received. If the table is stored at the system 200 (or another suitable system), the system 100 may indicate the electronic transactions to the system 200 (or other suitable system) in order to update the table. As such, the table of electronic transactions may evolve over time. In some implementations, older electronic transactions may be removed from the table. For example, electronic transactions older than a year (such as based on a payment date field) may be removed periodically. As such, batch processing of the electronic transactions may be performed periodically (such as daily, weekly, monthly, or quarterly) to update the clusters, numerical representations, and aggregates to be used for evaluation of future electronic transactions.

Referring back to 332, once the requested electronic transaction 326 is matched to a cluster 314 (or a filtered cluster 318), the system 100 uses the one or more aggregates 324 associated with the matched cluster 314 (or matched cluster 318) to generate the probabilities 334 to be used in identifying whether the requested electronic transaction 326 is valid or is potentially associated with a phishing attempt. As noted above, example aggregates include (but are not limited to) an aggregate of a payment amount to the vendor, an aggregate of a payment method to the vendor, an aggregate of user accounts (such as number of electronic transactions associated with the same user account in the cluster), or an aggregate of day-of-month of payments to the vendor. Also as noted above, the aggregates may be distributions or other suitable statistics that may be used to generate a likelihood of the requested electronic transaction based on such aggregate (such as the likelihood of the requested electronic transaction's payment amount, day-of-month payment, or other suitable data point of the transaction as compared to the associated aggregate). The aggregates may be normalized as a distribution from 0 to 1 so that the likelihood is a location along the distribution to indicate the probability associated with the aggregate for the requested electronic transaction.

With the probabilities 334 for the requested electronic transaction 326 generated, the process flow 300 continues to 336, in which the system 100 identifies whether the requested electronic transaction 326 is valid based on the probabilities 334. In some implementations, the phishing detection engine 160 compares the one or more probabilities 334 to one or more thresholds. For example, the threshold 0.99 (or another suitable threshold) may be compared to each of the probabilities. If any of the probabilities is less than the threshold, the engine 160 may identify that the requested electronic transaction 326 is not valid (such as possibly being associated with a phishing attempt). With the threshold at 0.99, the requested electronic transaction 326 is considered not valid if the likelihood of any of, e.g., a payment amount, a day-of-month payment, etc. to the vendor is less than 1 percent. While the example depicts the requested electronic transaction as not being valid if any of the probabilities do not meet the threshold, in some other implementations, a combination of the probabilities may be used (such as a minimum number of probabilities not reaching the threshold before identifying the requested electronic transaction 326 as not valid). In addition, while the examples depict the same threshold being used for different probabilities, in some implementations, different thresholds may be used for comparison to different probabilities. The one or more thresholds may be statically defined or may be adjustable (such as by the user or a security team based on user requirements or account sensitivity).

In addition or alternative to the use of thresholds to identify whether the requested electronic transaction 326 is not valid, the phishing detection engine 160 may use a trained ML model to identify whether the requested electronic transaction 326 is valid. For example, the ML model may be any suitable classification model (such as a binary classification model). As noted, each previous electronic transaction 306 may be associated with a label indicating whether the electronic transaction is associated with a phishing attempt (such as a 0 to indicate that the transaction is valid and 1 to indicate the electronic transaction is associated with a phishing attempt). The ML model (such as a binary classification model) may be trained based on the labels using supervised learning. For example, training the ML model may include providing the one or more probabilities generated for an electronic transaction to the ML model, with the ML model generating a prediction as to whether the electronic transaction is valid. The system compares the prediction to the label associated with the electronic transaction and updates the ML model based on the results (such as based on a loss function for the difference between the predictions and the labels). In this manner, the ML model is trained to reduce the loss variable. With the trained ML model stored at the system 100, the system 100 may input the one or more probabilities 334 generated for the requested electronic transaction 326 into the trained ML model to generate a prediction as to (and thus identify) whether the requested electronic transaction 326 is valid. For example, the trained ML model may generate a probability as to whether the requested electronic transaction 326 is valid, and the probability may be compared to a threshold. If the probability is less than the threshold, the system 100 may identify the requested electronic transaction 326 as not valid.

The system 100 may provide an indication 338 as to a requested electronic transaction 326 not being valid (such as potentially being associated with a phishing attempt). Such indication may be provided to a security team to further review the requested electronic transaction 326 or to a user associated with the requested electronic transaction 326. In some implementations, the system 100 may also prevent the requested electronic transaction from being performed (340). For example, the system 100 may transmit instructions to a system hosting the service to not initiate the electronic transaction or to otherwise prevent execution of the electronic transaction. If the system 100 is configured to provide the service, the system 100 may prevent execution of the electronic transaction by, e.g., refusing to transmit a request to the user's financial institution or otherwise preventing execution of operations in performance of the electronic transaction. In this manner, execution of the electronic transaction may be prevented or delayed until further review or confirmation that the electronic transaction is valid (such as confirmation from the user or the security team reviewing the requested electronic transaction).

As shown in FIG. 3, the process flow includes an offline phase 302 and an online phase 304, which may both be performed by the same system or which may be performed by different systems. An example implementation of the online phase 304 for evaluation of an electronic transaction is depicted in the example process 400 of FIG. 4, and an example implementation of the offline phase 302 for the batch processing of previous electronic transactions is depicted in the example process 500 of FIG. 5. While the example process 400 is described as being performed by the system 100 and the example process 500 is described as being performed by the system 200 for clarity, both processes may be performed by the same system or may be distributed across any number of systems.

Figure 4:
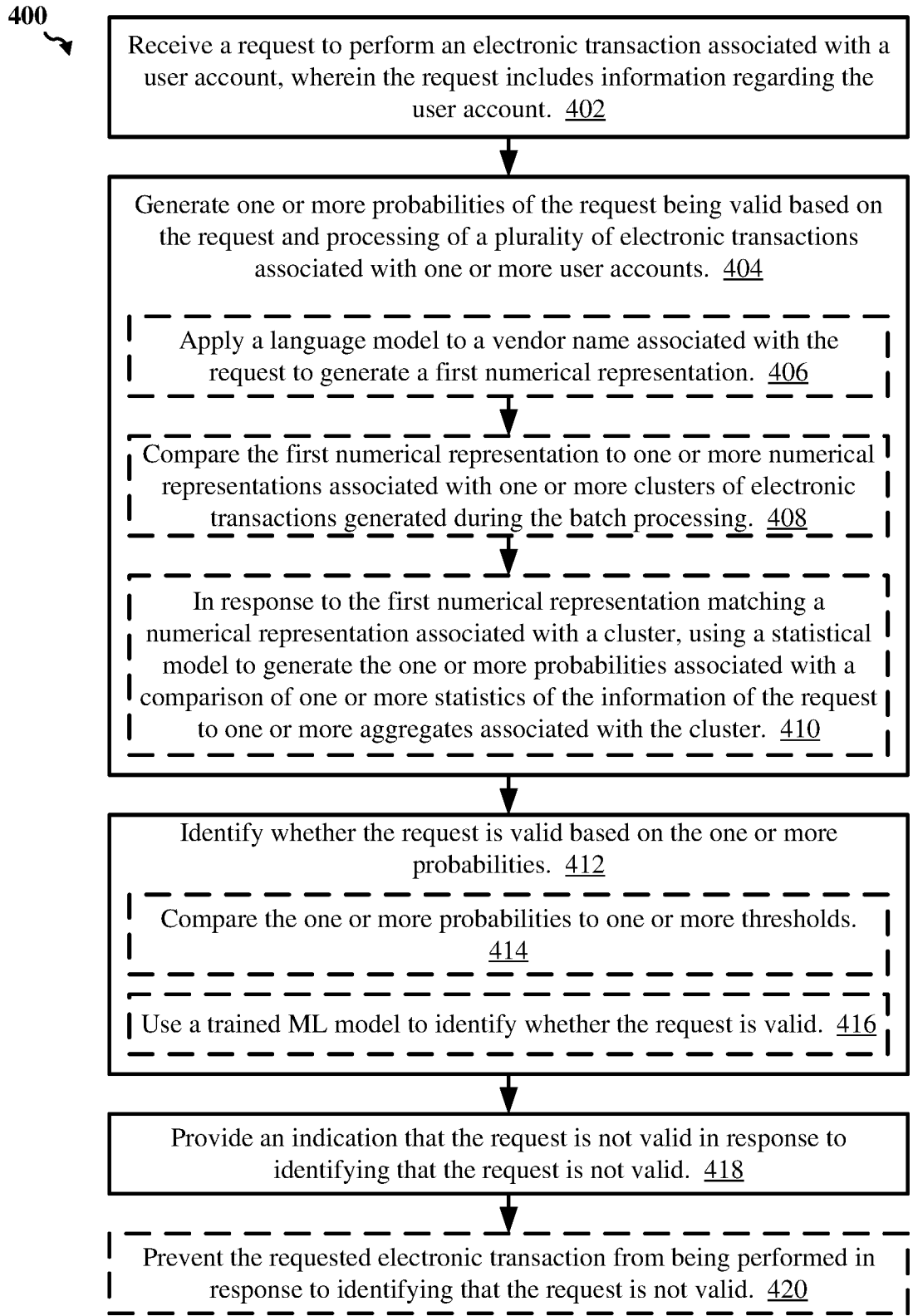
FIG. 4 shows an illustrative flow chart depicting an example process for automatic detection of phishing attempts, according to some implementations.

FIG. 4 shows an illustrative flow chart depicting an example process 400 for automatic detection of phishing attempts, according to some implementations. At 402, the system 100 receives a request to perform an electronic transaction associated with a user account, wherein the request includes information regarding the user account. For example, the request (also referred to as a requested electronic transaction) includes a tuple of datapoints associated with different aspects of the electronic transaction, such as a user account ID, vendor name, payment amount, and so on. The request may be received by the interface 110 from a system providing the service or during the system 100 providing the service.

At 404, the system 100 generates one or more probabilities of the request being valid based on the request and processing a plurality of electronic transactions associated with one or more user accounts. As described herein, processing the plurality of electronic transactions (also referred to as a batch processing of the plurality of electronic transactions) may be for previous electronic transactions during an offline phase in order to generate one or more aggregates associated with one or more different clusters of the electronic transactions that are to be used for generating the one or more probabilities. Example implementations of batch processing is described with reference to FIG. 3 and with reference to FIG. 5.

The one or more probabilities are based on the one or more aggregates of the cluster to which the request matches (such as having the same or similar vendor name). In some implementations, the system 100 (such as the language model engine 140) applies a language model to the vendor name associated with the request to generate a first numerical representation (406). For example, the system 100 applies the S-BERT encoder to the vendor name to generate a numerical vector. During batch processing of the previous electronic transactions, the same language model may be applied to the vendor names of the previous electronic transactions. In this manner, the clusters may be generated based on the densities of the numerical vectors (or other suitable numerical representations), and the numerical vector associated with the request may be used to match the request to a cluster based on the numerical vectors of the cluster. In some implementations, the system 100 may compare the first numerical representation to one or more numerical representations associated with the one or more clusters (408). For example, the system 100 may determine if the first numerical representation matches a numerical representation of the one or more clusters, or the system 100 may determine if the request is within a threshold distance (based on any suitable distance metric) between the first numerical representation and a numerical representation of an electronic transaction within the one or more clusters.

In response to the first numerical representation matching a numerical representation associated with a cluster of the one or more clusters, the system 100 may use a statistical model to generate the one or more probabilities associated with a comparison of one or more statistics of the information of the request to the one or more aggregates associated with the cluster (410). For example, as described above, the system 100 may use a distribution regarding the payment amounts for electronic transactions in a cluster matching the request and the payment amount of the request itself to determine a likelihood that the payment amount is valid. Other probabilities may be generated for the request in a similar manner for other data types of the transactions (such as day-of-month payments, payment type, and so on) using the aggregate generated for the specific data type. Any suitable model and distribution may be used to generate the one or more probabilities associated with the request. As noted above, the aggregates may be normalized so that they and the resulting probabilities may be compared to one another across different data types.

Proceeding to 412, the system 100 identifies whether the request is valid based on the one or more probabilities. In some implementations, the system 100 may compare the one or more probabilities to one or more thresholds in order to determine whether the request is valid (414). In some other implementations, the system 100 may use a trained ML model to identify whether the request is valid (416). As noted above, the ML model may be a binary classification model or another suitable model trained to identify whether the request is valid based on the one or more probabilities associated with the request that are provided as an input to the model.

At 418, the system 100 provides an indication that the request is not valid in response to identifying that the request is not valid. For example, a notification may be sent per email, text message, push notification, or via other means to a security team or to a user. In this manner, the security team or the user may further review the request to ensure that the request is or is not valid. In some implementations, the system 100 may also prevent the requested electronic transaction from being performed in response to identifying that the request is not valid (420). For example, the system 100 may prevent the electronic transaction from being executed in providing the service or may provide instructions to a system providing the service to prevent execution of the electronic transaction. While evaluation of one requested electronic transaction is described with reference to FIG. 4 for clarity, a system may be configured to perform process 400 for a plurality of requested electronic transactions, and processing of a plurality of requested electronic transactions may be performed concurrently or sequentially. As such, the present disclosure is not limited to a specific number of electronic transactions to be evaluated in a specific order.

As noted with reference to 404, generating the one or more probabilities for the request is based on the previous batch processing of electronic transactions. For example, as described herein, batch processing includes generating clusters of the electronic transactions and aggregates associated with each cluster that may be used in generating the one or more probabilities for the request. Batch processing (which is also described above with reference to FIG. 2 and FIG. 3) is described below with reference to FIG. 5.

FIG. 5 shows an illustrative flow chart depicting an example process 500 for batch processing of previous electronic transactions, according to some implementations. At 502, the system 200 obtains the plurality of electronic transactions associated with one or more user accounts, wherein each electronic transaction includes information regarding a user account of the one or more user accounts. For example, for at least a subset of users of a service (such as all users that agree to the use of electronic transactions for analysis purposes), the system 200 may obtain the information regarding the last year's (or another suitable time period) worth of electronic transactions. The electronic transactions may be obtained by a system storing a table of previous electronic transactions (such as a system providing the service or a system for archival purposes). In some implementations, the system 200 may be used for archival purposes of previous electronic transactions, and a table of the previous electronic transactions may be stored in the database 220 and used in obtaining the plurality of electronic transactions in 502.

At 504, the system 200 generates a plurality of numerical representations associated with the plurality of electronic transactions based on applying a language model to at least a portion of the information of each electronic transaction of the plurality of electronic transactions. For example, the language model engine 240 may apply a bilateral language model to a vendor name of an electronic transaction to generate a numerical representation for the electronic transaction (506). In some implementations, the language model engine 240 applies the S-BERT encoder to the vendor name to generate a numerical vector (508). Generating the numerical representation in 504 may be similar to the generation of the numerical representation in 406 of FIG. 4.

At 510, with the numerical representations generated for each electronic transaction, the system 200 clusters the plurality of electronic transactions into one or more clusters based on applying a clustering algorithm to the plurality of numerical representations. In some implementations, the system 200 applies the DBSCAN algorithm to the plurality of numerical vectors generated using the S-BERT encoder to cluster the electronic transactions (512). However, any suitable clustering algorithm may be used to cluster the electronic transactions based on the numerical representations (which represent the vendor name). As such, each cluster is associated with a specific vendor. The clustering allows electronic transactions for the same vendor but with variations in the vendor name to be identified, and the electronic transactions may be segmented such that electronic transactions associated with a same vendor are used for the evaluation of a requested electronic transaction associated with such vendor. In this manner, previous electronic transactions associated with other vendors may not influence the evaluation of the requested electronic transaction.

As noted above with reference to FIG. 3, in some implementations, the system 200 may filter out one or more electronic transactions associated with a cluster of insufficient size from batch processing (514). For example, the system 200 may, for each cluster, determine a number of user accounts across electronic transactions of the cluster. In determining the number of user accounts, the system 200 may count the number of unique user account IDs across the electronic transactions of the cluster by using the user ID field in the table stored in the database 220. If not a sufficient number of users make payments to the vendor, the cluster may be of insufficient size such that any prediction by the system 100 as to the validity of a requested electronic transaction may be biased by the small sample size. As such, the system 200 may compare the number of user accounts determined to a threshold (such as at least 1,000 unique user account IDs being associated with the cluster). In response to the number being less than the threshold, the system 200 may remove the electronic transactions of the cluster from the batch processing. In this manner, the system 200 may not perform the operations in 516 to generate one or more aggregates for the clusters of electronic transactions that are filtered out by the system 200. As noted above, if aggregates are not generated for a cluster that is associated with a request (or a request is not matched to a cluster in 410), the system 100 may not generate the one or more probabilities in 404 and identify whether a request is valid in 412. As such, predictions by the system 100 may be limited to electronic transactions for vendors associated with a cluster of electronic transactions of sufficient size.

Referring back to FIG. 5, at 516, the system 200 generates, for each cluster, one or more aggregates of the information regarding the user account across the electronic transactions of the cluster, wherein the one or more probabilities generated by the system 100 in 404 are associated with the one or more aggregates. For example, for each cluster (or for each remaining cluster after filtering), the system 200 generates a distribution or statistic for one or more data types across the electronic transactions of the cluster (such as a distribution of payment amounts, count of day-of-month payments, and so on), and a data point associated with a request at system 100 may be compared to the distribution or statistic to generate a probability as to the likelihood that the data point is valid (such as a probability that a requested payment amount is a valid amount that would be seen for a transaction with the vendor associated with the cluster). Any number of aggregates may be generated per cluster, and as such, any number of probabilities may be generated per requested electronic transaction. As noted above with reference to FIG. 3, the aggregates for the clusters, the numerical representations for the clusters (such as the numerical vectors representing the vendor names for each cluster), and (optionally) the table of electronic transactions may be used by the system 100 in evaluating the requested electronic transaction received at the system 100 (such as described above).

As described herein, systems and methods to automatically detect and handle electronic transactions that may be associated with phishing attempts are described. In using automatic evaluation of electronic transactions to detect phishing attempts through the use of the described vendor name matching and probabilities generation and usage for different data types, a vast number of electronic transactions may be evaluated with a higher accuracy in detecting phishing attempts than through the use of traditional means.

While example implementations are described above for clarity in disclosing aspects of the present disclosure, various modifications to the implementations described in this disclosure may be readily apparent to those skilled in the art, and the principles defined herein may be applied to other implementations without departing from the spirit or scope of this disclosure. For example, while electronic transactions are described as financial transactions in the examples, electronic transactions may be other types of operations, such as login attempts to a service, application usage logs, or any other transactions in which anomalous activity is to be detected. In another example, while the clustering is described as being based on vendor through the use of a language model applied to a vendor name data type, the language model may be applied to a different data type such that clustering may not be based on vendor. For example, clustering may be based on location of the transaction or another suitable metric that may be used to segment the electronic transactions into relevant data sets.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation.

The claims presented herein are not intended to be limited to the implementations shown herein but are to be accorded the widest scope consistent with this disclosure, the principles, and the novel features disclosed herein.

What is claimed is:

1. A computer-implemented method for automatic detection of phishing attempts, comprising:
   receiving a request to perform an electronic transaction associated with a user account, wherein the request includes information regarding the user account;
   generating one or more probabilities of the request being valid based on the request and processing a plurality of electronic transactions associated with one or more user accounts, wherein the processing includes:
      obtaining the plurality of electronic transactions, wherein each electronic transaction includes information regarding a user account of the one or more user accounts, wherein the information regarding the user account for each electronic transaction and requested electronic transaction includes a vendor name associated with the electronic transaction;
      generating a plurality of numerical representations associated with the plurality of electronic transactions based on applying a language model to at least a portion of the information of each electronic transaction of the plurality of electronic transactions, wherein:
         the at least portion of the information of each electronic transaction to which the language model is applied includes the vendor name associated with the electronic transaction;
         the language model includes a bidirectional language model; and
         the plurality of numerical representations include a plurality of numerical vectors;
      clustering the plurality of electronic transactions into one or more clusters based on applying a clustering algorithm to the plurality of numerical representations; and
      for each cluster, generating one or more aggregates of the information regarding the user account across the electronic transactions of the cluster, wherein the one or more probabilities are associated with the one or more aggregates;
   identifying whether the request is valid based on the one or more probabilities; and
   in response to identifying that the request is not valid, providing an indication that the request is not valid.

2. The computer-implemented method of claim 1, wherein:
   the bidirectional language model includes a sentence-bidirectional encoder representations from transformers (S-BERT) encoder.

3. The computer-implemented method of claim 2, wherein the clustering algorithm includes a density-based spatial clustering of applications with noise (DBSCAN) algorithm to be applied to the plurality of numerical vectors.

4. The computer-implemented method of claim 1, wherein generating the one or more probabilities includes:
   generating a first numerical representation associated with the request based on applying the language model to the vendor name associated with the request;

comparing the first numerical representation to one or more numerical representations associated with the one or more clusters; and in response to the first numerical representation matching a numerical representation associated with a cluster of the one or more clusters, generating the one or more probabilities associated with a comparison of one or more statistics of the information of the request to the one or more aggregates associated with the cluster.

5. The computer-implemented method of claim 4, wherein identifying whether the request is valid includes comparing the one or more probabilities to one or more thresholds.

6. The computer-implemented method of claim 1, wherein identifying whether the request is valid includes:
   providing the one or more probabilities generated for the requested electronic transaction to a trained machine learning (ML) model, wherein, for each of the plurality of electronic transactions:
      the electronic transaction is associated with a label indicating whether the electronic transaction is associated with a phishing attempt; and
      the trained ML model is trained based on the label and one or more probabilities generated for the electronic transaction regarding whether the electronic transaction is valid; and
   identifying, by the trained ML model, whether the request is valid based on the one or more probabilities provided to the trained ML model.

7. The computer-implemented method of claim 1, wherein the processing also includes, for each cluster:
   determining a number of user accounts across electronic transactions of the cluster;
   comparing the number to a threshold; and
   removing the electronic transactions of the cluster from the processing in response to the number being less than the threshold.

8. The computer-implemented method of claim 1, wherein:
   the one or more aggregates includes an aggregate of one or more of:
      a payment amount;
      a payment method;
      a user account; or
      a day-of-month of payments; and
   generating the one or more aggregates includes normalizing each of the one or more aggregates to be a distribution from 0 to 1.

9. The computer-implemented method of claim 1, further comprising preventing the requested electronic transaction from being performed in response to identifying that the request is not valid.

10. A system for automatic detection of phishing attempts, comprising:
   one or more processors; and
   a memory storing instructions that, when executed by the one or more processors, causes the system to perform operations comprising:
      receiving a request to perform an electronic transaction associated with a user account, wherein the request includes information regarding the user account;
      generating one or more probabilities of the request being valid based on the request and processing a plurality of electronic transactions associated with one or more user accounts, wherein the processing includes:

obtaining the plurality of electronic transactions, wherein each electronic transaction includes information regarding a user account of the one or more user accounts, wherein the information regarding the user account for each electronic transaction and requested electronic transaction includes a vendor name associated with the electronic transaction;

generating a plurality of numerical representations associated with the plurality of electronic transactions based on applying a language model to at least a portion of the information of each electronic transaction of the plurality of electronic transactions wherein:
   the at least portion of the information of each electronic transaction to which the language model is applied includes the vendor name associated with the electronic transaction;
   the language model includes a bidirectional language model; and
   the plurality of numerical representations include a plurality of numerical vectors;

clustering the plurality of electronic transactions into one or more clusters based on applying a clustering algorithm to the plurality of numerical representations; and for each cluster, generating one or more aggregates of the information regarding the user account across the electronic transactions of the cluster, wherein the one or more probabilities are associated with the one or more aggregates;

identifying whether the request is valid based on the one or more probabilities; and in response to identifying that the request is not valid, providing an indication that the request is not valid.

11. The system of claim 10, wherein:
   the bidirectional language model includes a sentence-bidirectional encoder representations from transformers (S-BERT) encoder.

12. The system of claim 11, wherein the clustering algorithm includes a density-based spatial clustering of applications with noise (DBSCAN) algorithm to be applied to the plurality of numerical vectors.

13. The system of claim 10, wherein generating the one or more probabilities includes:
   generating a first numerical representation associated with the request based on applying the language model to the vendor name associated with the request;
   comparing the first numerical representation to one or more numerical representations associated with the one or more clusters; and
   in response to the first numerical representation matching a numerical representation associated with a cluster of the one or more clusters, generating the one or more probabilities associated with a comparison of one or more statistics of the information of the request to the one or more aggregates associated with the cluster.

14. The system of claim 13, wherein identifying whether the request is valid includes comparing the one or more probabilities to one or more thresholds.

15. The system of claim 10, wherein identifying whether the request is valid includes:
   providing the one or more probabilities generated for the requested electronic transaction to a trained machine learning (ML) model, wherein, for each of the plurality of electronic transactions:

the electronic transaction is associated with a label indicating whether the electronic transaction is associated with a phishing attempt; and the trained ML model is trained based on the label and one or more probabilities generated for the electronic transaction regarding whether the electronic transaction is valid; and identifying, by the trained ML model, whether the request is valid based on the one or more probabilities provided to the trained ML model.

16. The system of claim 10, wherein the processing also includes, for each cluster:

determining a number of user accounts across electronic transactions of the cluster;

comparing the number to a threshold; and removing the electronic transactions of the cluster from the processing in response to the number being less than the threshold.

17. The system of claim 10, wherein:

the one or more aggregates includes an aggregate of one or more of:
- a payment amount;
- a payment method;
- a user account; or
- a day-of-month of payments; and generating the one or more aggregates includes normalizing each of the one or more aggregates to be a distribution from 0 to 1.

18. The system of claim 10, wherein the operations further comprise preventing the requested electronic transaction from being performed in response to identifying that the request is not valid.

* * * * *